July 14, 1942.    G. S. TARBELL    2,290,003
SIDE HILL DRAFT MECHANISM
Filed Oct. 1, 1940    2 Sheets-Sheet 1
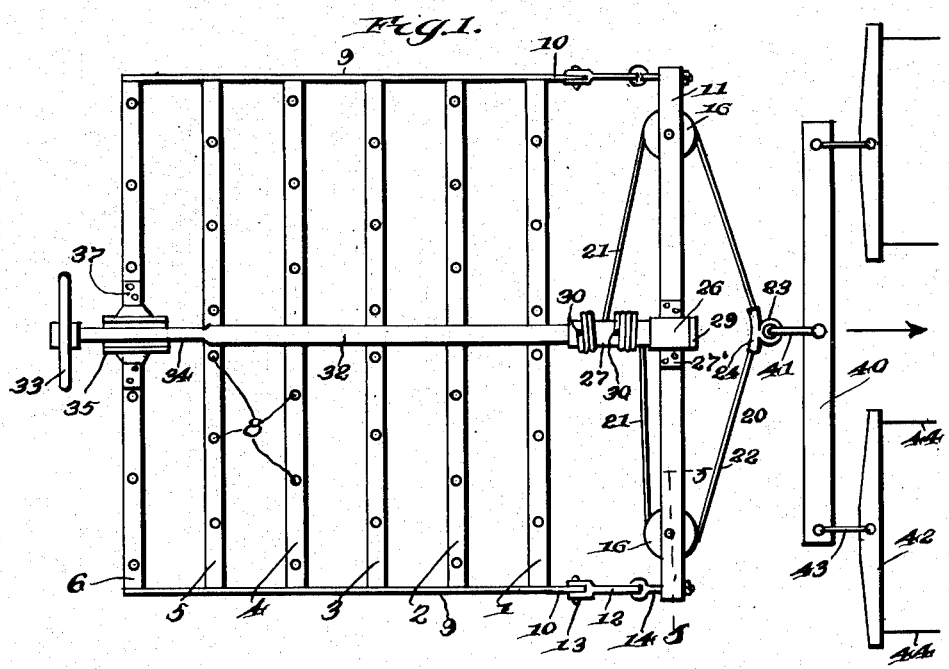
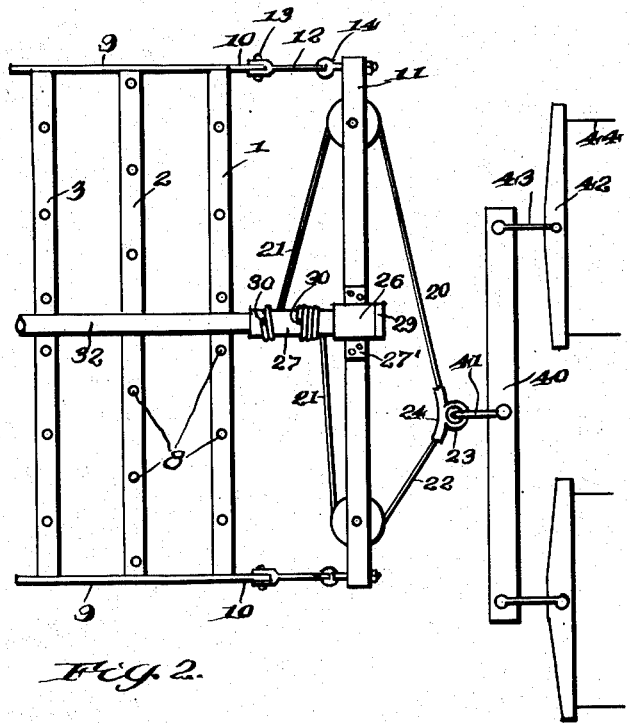
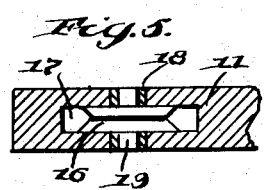
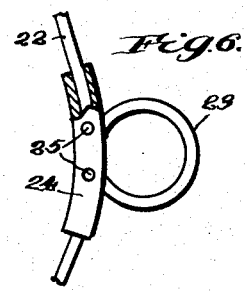
INVENTOR
Grove S. Tarbell
BY Carl H. Crawford
ATTORNEY July 14, 1942.                G. S. TARBELL                2,290,003
                          SIDE HILL DRAFT MECHANISM
                            Filed Oct. 1, 1940           2 Sheets-Sheet 2
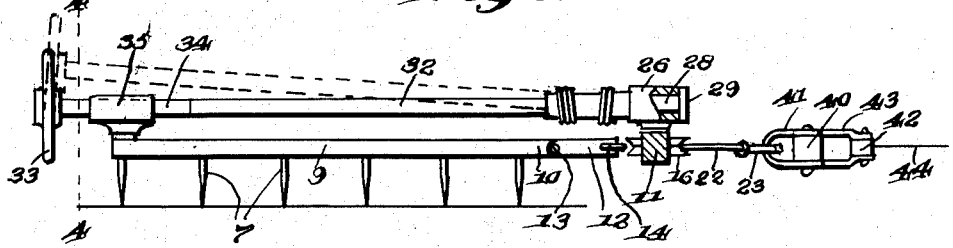
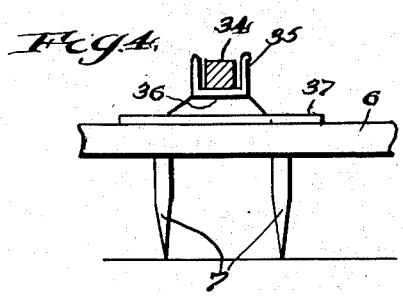
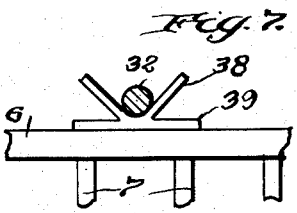
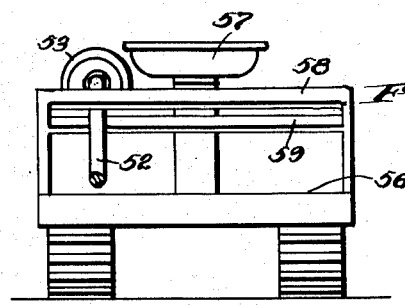
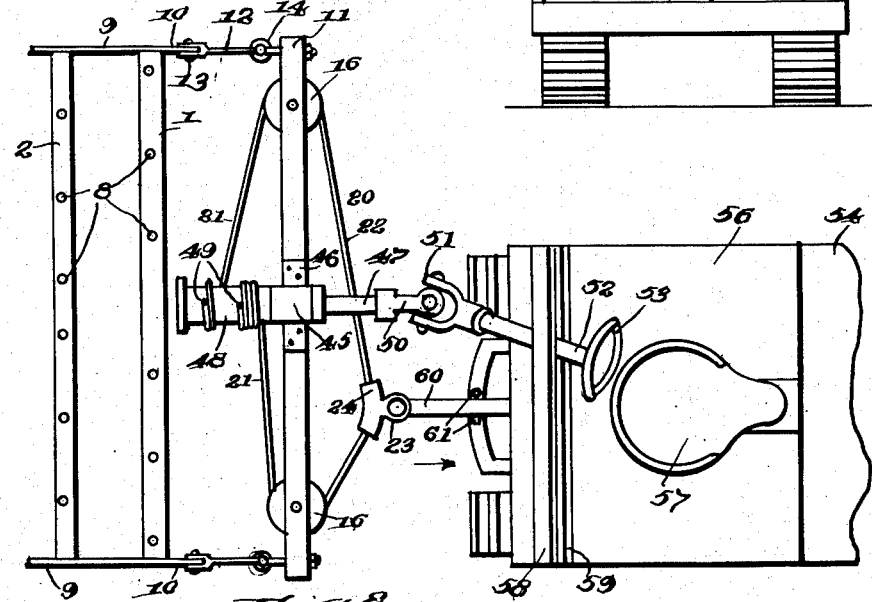
INVENTOR
Grove S. Tarbell
BY
Carl H. Crawford
ATTORNEY Patented July 14, 1942

2,290,003

UNITED STATES PATENT OFFICE 2,290,003

SIDEHILL DRAFT MECHANISM

Grove S. Tarbell, Colville, Wash., assignor of one-half to Fred Draper, Colville, Wash.

Application October 1, 1940, Serial No. 359,251

3 Claims. (Cl. 97—239)

The object of this invention is to provide a laterally adjustable draft device for harrows and like agricultural implements and the invention resides in the combination of this device to such an implement, and also as an article of manufacture.

When a harrow or the like is being advanced over a field by a draft means, such as a team of horses or a tractor, it is necessary, in order completely to cultivate the soil, that the teeth of the harrow be maintained in staggered relation so that they will not "track." If they are allowed to "track" then large areas of the soil will be missed and will remain uncultivated.

If the ground is either undulating or hilly, and the line of draft is constantly in one position, then the harrow will slide downwardly while being advanced about a hill in such a manner that the teeth will "track."

Now it is an object of this invention to provide a novel draft means adapted for attachment to a harrow, said means being equipped with apparatus whereby either a following driver, or a preceding tractor operator, can shift the line of draft laterally in such a manner that the longitudinal axis of the harrow will always be in alined relation with the line of draft so that the teeth of the harrow will be maintained in the same staggered relation along the side of the hill, as when advancing along level ground.

It is a special feature of this invention to provide such a device with means whereby the line of draft may be shifted while the harrow is being advanced, and without stopping either the team or the tractor, this adjustment being possible to any extent, and with wide variations, in accordance with the changing ground levels over which the harrow is being advanced.

The invention has other features and objects which will be more fully described in connection with the accompanying drawings and which will be more particularly pointed out in and by the appended claims.

In the drawings:

Fig. 1 is a plan view of a peg tooth harrow showing the device of my invention attached thereto and adjusted to dispose the line of draft centrally of the harrow, or in other words, in line with the longitudinal axis of the harrow, such as would be employed on level ground.

Fig. 2 is a similar view showing such adjustment as might be made if the harrow were being advanced around a hill.

Fig. 3 is a view in side elevation of the harrow with parts in section.

Fig. 4 is an enlarged sectional view on line 4—4 of Fig. 3.

Fig. 5 is a sectional view on line 5—5 of Fig. 1.

Fig. 6 is an enlarged plan view partly in section of a draft element.

Fig. 7 is a view of modified form of shaft holder, with the shaft in section.

Fig. 8 is a plan view showing how the device of my invention is used when the harrow is drawn by a tractor, with the line of draft shifted as shown.

Fig. 9 is a rear view of the tractor looking in the direction of the arrow shown in Fig. 5.

Like characters of reference designate similar parts throughout the different figures of the drawings.

For purposes of illustrating this invention, I have shown a simple type of peg tooth harrow with all extraneous details omitted, but it is understood that my invention is not limited to this particular type of harrow and it will be understood that the harrow shown represents only one kind of agricultural implement for which the device of my invention is adapted.

As shown, the harrow includes a plurality of transversely disposed tooth bars 1 to 6, each being equipped with a plurality of teeth which will be collectively indicated at 7, since all are alike in form and function. It will be seen from Fig. 1 that the teeth 7 are in staggered relation so that they will not "track," which is the usual form, and I have shown this by illustrating the heads of the teeth, which are collectively indicated at 8. The ends of bars 1 to 6 are suitably connected with longitudinally disposed frame members 9, having forward ends 10.

Since the device of my invention is equally adapted to harrows made either in one or more sections, I have herein shown the device applied to a single section harrow, as any alteration to adapt the device to a plural section harrow would be clearly within the range of mechanical skill in view of this disclosure.

Reference will now be made to one of the main features of the invention, with special reference to Figs. 1, 2, 3 and 4.

A draft bar is indicated at 11, and as shown, this bar extends across the front of the harrow and may be of a length practically equal to the width of the latter. This bar 11 is in draft connection with the harrow and, as shown, the connection is flexible in order to afford the bar 11 a limited but desirable degree of play vertically, as a result of draft slack and pull. Therefore said bar 11, may be said to be floatingly connected with the harrow.

As shown, links 12 are pivoted at 13 to frame members 9, and eye-bolts 14 secured to bar 11 have pivoted connection with links 12. This specific form of flexible connection is not of importance to the invention as it is of known type.

A cable sheave is rotatively mounted in bar 11, near each end thereof, and as both sheaves are identical in form and function, only one need be described in detail, reference being made to Figs. 1 and 5.

The sheave is indicated at 16 and I have shown bar 11 provided with a suitable opening 17, in which the sheave 16 is disposed so that the sheave will be located in a substantially horizontal position. The bar 11, if formed of wood, may be provided with metal bushings 18 through which a shaft 19 of the sheave may extend and be journaled. However, the particular manner of journalizing the sheave is not important.

A draft cable, which may be of a single length, is indicated at 20, and while I have herein shown a cable, it will be understood that I use the term generically to include a chain, rope or other like element. Said cable is trained over sheaves 16 and its end portions 21 are shown disposed in the rear of bar 11, while the bight of said cable, indicated at 22, is disposed forwardly of said bar 11, and is provided with a draft element which may consist of a ring 23 rigidly secured to said bight so that said ring will always be in fixed relation to said cable.

As shown, the ring 23 may be provided with an attaching sleeve 24, through which the bight 22 of the cable is extended and suitably fixed, as for instance, in crimping the sleeve against the cable or by inserting pins 25 therethrough. Hence, it will be clear that the draft element or ring 23 is fixed to the bight of the cable.

Reference will next be made to the means for controlling and actuating the cable in order to shift the line of draft to, or from a central position, and to any position in either direction from a central position.

As shown, a winch device is mounted on the draft bar 11, and it consists of a bearing 26, having flanges 27' secured to said bar 11. Said bearing 26 is disposed substantially centrally between the ends of said draft bar 11, and with its longitudinal axis at substantially right angles to the longitudinal axis of bar 11. A winding drum 27 has a shaft 28 journaled in said bearing and a collar 29 holds the shaft against lengthwise movement in one direction while the winding drum prevents longitudinal movement in the other direction.

The inner end portions 21 of the draft cable are shown wound about said drum, and as shown, they are wound in opposite directions, and the terminal ends are fixed thereto as indicated at 30. Thus, it will now be clear that when the drum 27 is rotated in one direction, one end portion 21 will be paid out, and the other end portion 21 will be paid in, thereby acting to shift the draft element 23 laterally along the bar 11. It will be clear that the cable will be slack, except when draft pull is exerted thereon, and it will also be clear that the bar 11 may descend into contact with the ground when no draft pull is exerted, or be lifted up at an inclination to the horizontal when draft pull is applied to the cable.

Reference will next be made to the means for, or whereby rotative movement may be applied to the drum 27 in opposite directions, and also the means whereby the drum may be held in the rotative position to which it has been adjusted.

A retaining shaft 32 may form an integral part of drum 27 and shaft 28. In fact, the three portions may, as shown, constitute a single shaft unit, but because portions of this shaft unit perform separate functions, they are given separate designations. The retaining shaft 32 extends, in this form of the invention, longitudinally over the harrow and toward the rear thereof, and on its rear end it is provided with an actuating member which may consist of a hand wheel 33. For some distance in advance of the hand wheel 33 the retaining and actuating shaft member 32 is provided with flattened sides, or it may be of any polygonal cross section as indicated at 34, in Figs. 1 and 4.

A shaft supporting and holding means is provided which may consist of an elongated U-shaped holder having upright flanges 35 and a base 36 in which the polygonal portion 34 is adapted to be received. Said holder may be provided with flanges 37 which may be removably or otherwise secured to the rear tooth bar 6. However, the manner in which this shaft holder is mounted will vary on harrows of different construction, and the holder is of major importance in the performance of its function as a shaft retainer and support, irrespective of the manner in which the holder is mounted on the harrow.

It will now be clear that the polygonal portion 34 is of sufficient length to compensate for the longitudinal variation of movement of bar 11 forwardly and backwardly, due to draft pull and draft slack, respectively, and because the U-shaped holder is open at the top, the shaft member 32 can fulcrum in the holder to permit any vertical movement of bar 11. Further, it will be seen that the shaft fits fairly loosely in the holder to permit of any shifting of the shaft 32, responsive to turning movement of the harrow. This freedom of movement of shaft member 32 in the holder is necessary by reason of the fact that the shaft is journaled in bearing 26 so that it is held thereby to a fixed rotative axis with respect to bar 11.

However, if the retaining feature is not considered necessary, the shaft member 32 may be loosely supported by a V-shaped support as shown in the modified form in Fig. 7, wherein a support is shown having V-shaped members 38 mounted on bar 6 by flanges 39 suitably secured to said bar 6.

When the draft means employed is a team of horses, an evener 40, having a clevis 41, will be attached to the draft element 23, and the evener 40 will of course have the usual trees 42 pivoted thereto by clevises 43. The tugs are diagrammatically shown at 44.

The invention is fundamentally the same, whether the harrow is drawn by horses or a tractor, with the slight difference that the actuating means, in case a tractor is used as a draft means, will be extended forwardly instead of rearwardly of draft bar 11.

Next referring to Figs. 8 and 9, it will be seen that I have shown the forward part of the same type of harrow shown in Fig. 1, to which the same reference numerals have been applied. The draft bar 11 is connected in draft relation to the harrow in the same manner as in the preferred form and is provided with sheaves 16 and a draft cable 20, having end portions 21 and a bight portion 22, the latter having a draft element or ring 23 in fixed relation to the bight portion. In either the preferred or modified form the cable may be of a single length, or it may be of two lengths, providing it is disposed and connected up in substantially the manner shown.

In this form of the invention the winch device consists of a bearing 45 provided with flanges 46 secured to the draft bar, with the longitudinal axis of the bearing disposed transversely to the longitudinal axis of the bar 11. A shaft 47 is journaled in said bearing and may be formed integral with a winding drum 48 disposed rearwardly of bar 11. The end portions 21 are wound about drum 48 in opposite directions and are shown anchored at 49 thereto. The forwardly extending portion of shaft 47 is shown provided with one member 50, of a universal joint, the remaining member 51 thereof being disposed on an actuating or adjusting shaft 52 which is shown provided with a hand wheel 53.

The rear end of a tractor is generally shown at 54, the rear platform being indicated at 56, and the driver's seat at 57. A horizontally disposed loop guide is provided having upper and lower guiding members 58 and 59, respectively, through which the adjusting shaft 52 extends, and whereby it may be shifted by the driver in either of two lateral directions into a position accessible from the driver's seat, irrespective of the relation which the tractor occupies with respect to the harrow.

The tractor is provided with a draw-bar 60, held to a substantially fixed lateral position by pins 61, and said draw-bar is coupled to draft element 23 in the usual manner.

While the operation may be clear from the foregoing description, it will be briefly recapitulated as follows:

When the harrow is to be advanced along level ground, the device is adjusted to the Fig. 1 position, wherein the line of draft or pull, indicated by the arrow, is in alinement with the longitudinal axis of the harrow. Thus, all the teeth of the harrow will cultivate the complete area over which the harrow is advanced because the teeth will be, as shown, in staggered relation.

However, assuming that the harrow is traversing a side hill, then and in that event, the harrow would slide downwardly if the line of draft were exerted centrally, as in Fig. 1, and hence, such a position of the harrow would cause the teeth to "track" and therefore the area traversed would not be completely cultivated. On reaching a side hill, and without stopping, the operator, if walking, would turn wheel 33 and rotate the drum 27, as shown in Fig. 2, so as to shift the line of draft laterally of a central position sufficiently so that the harrow would advance in the manner shown in Fig. 2, with the teeth engaging the ground in staggered relation. It will be obvious that if the operator driving the team were riding on the harrow it would be within mechanical skill to dispose the wheel 33 in easy accessibility with the seat.

In the present form, and referring to Fig. 3, it will be clear that before turning wheel 33, the operator would lift the same to disengage the polygonal portion 34 from the holder, as shown in dotted lines. This would require only a minimum of effort since the leverage afforded by the length of the shaft 32 would make it easy to slightly shift the draft bar 11 for this purpose, even when draft pull was being exerted. In order to be sure the adjustment was retained the shaft 32 would then be lowered into the holder 35, and the adjustment would be maintained until a further adjustment was made. If the retaining feature were omitted a simple form of support, such as shown in Fig. 7, could be substituted for that shown in Fig. 1, in which event the hand wheel 33 could be turned without lifting the shaft 32.

Of course, it will now be clear that an adjustment in a direction opposite to the first named adjustment could as readily be made.

It will also be clear that because the shaft 32 is journaled in a fixed bearing 26 it is rotatively maintained in fixed relation to draft bar 11, hence it is the function of holder 35 and support 38 to permit the shaft 32 to fulcrum thereon whenever the draft bar changes its vertical position, such as when under draft pull it is raised, or when lowered by draft slack. Such variable movement of draft bar 11 is afforded by reason of the flexible link connection thereof with the harrow.

The operation of the form shown in Figs. 8 and 9 will be obvious from the foregoing as the invention in both forms is fundamentally the same. The only specific difference is that instead of extending rearwardly, the shaft 47 extends forwardly. The wheel 53 will at all times be accessible to the driver on seat 57, as he can shift the shaft 52 to any lateral position in the loop guides 58 and 59, by reason of the flexible connection which is shown in the form of a universal joint, previously described and indicated at 50 and 51. Thus, in both forms the operating shaft extends in a transverse direction from the draft bar 11.

It is desired to point out the great advantage of having the shaft unit rotatively mounted in fixed relation to the draft bar, and the sheaves 16 also in fixed relation thereto, since by this structural disposition the draft cable, irrespective of what form it takes, will be prevented from getting off from the sheaves, and will always be in an effective position to be wound and unwound onto and off from the winding drum.

While I have shown a specific form of structure, it will be seen that broadly speaking, the draft bar is provided with a draft connection, namely ring 23, and means for shifting said connection, either when under slack or draft pull, in lateral directions with respect to the draft bar to alter or change the line of draft from a central to either of two directions laterally of a central position.

It is believed that my invention will be clearly understood from the foregoing description, and while I have herein shown and described specific forms of my invention, I do not wish to be limited thereto except for such limitations as the claims may import.

I claim:

1. In a laterally adjustable draft device, the combination with a harrow, of a draft bar extending across and being flexibly connected with the front of the harrow, a winch device mounted on said bar substantially centrally of the length thereof and having a drum extending transversely and rearward of said bar and provided with a drum shaft extending over said harrow and provided with an actuating member accessible from the rear of said harrow, means mounted on said harrow for holding said shaft against rotation irrespective of the vertical position of said draft bar, a cable sheave rotatively mounted near each end of said draft bar, and a draft cable trained about said sheaves and having its end portions wound about said drum in opposite directions and the bight of said cable extending forwardly across the front of said bar and having a draft element fixed thereto for connection with a draft means, whereby said drum may be rotated to shift said draft element into a central position or into any position in either direction laterally of a central position while the harrow is advancing to maintain the harrow in alinement with the line of draft irrespective of varying ground levels.

2. In a laterally adjustable draft device, the combination with a harrow, of a draft bar extending across and having draft connection with the front of said harrow, a winch device mounted on said draft bar substantially centrally between the ends thereof and having a drum extending transversely and rearwardly of said bar and provided with an actuating member for rotating said drum, a cable sheave rotatively mounted near each end of said bar, and a draft cable trained about said sheaves and having its end portions wound about said drum in opposite directions and the bight of said cable extending along the front of said bar and having a draft element fixed thereto for connection with a draft means, whereby said drum may be rotated to shift said draft element into a central position or into any position in either direction laterally of a central position while the harrow is advancing to maintain the harrow in alined relation with the line of draft irrespective of varying ground levels.

3. In a laterally adjustable draft device for harrows or the like, a draft bar having means for floatingly connecting said bar with a harrow adapted to be disposed transversely of the line of draft, a winch device mounted on said draft bar substantially centrally of the ends thereof and provided with a drum and an actuator, a cable sheave rotatively mounted near each end of said bar, and a draft cable trained about said sheaves and having its end portions wound about said drum and the bight of said cable extending along the front of said bar and having a draft element secured thereto for connection with a draft means, whereby rotation of said drum will shift said element into various draft positions laterally of said bar.

GROVE S. TARBELL.